United States Patent
Nordqvist

[15] 3,655,990
[45] Apr. 11, 1972

[54] RADIATION SENSITIVE LENGTH MEASURING SYSTEM

[72] Inventor: Karl Gustav Nordqvist, Nynashamn, Sweden

[73] Assignee: Rederiaktiebolaget Nordstjernan, Nynashamn, Sweden

[22] Filed: Oct. 30, 1968

[21] Appl. No.: 771,909

[30] Foreign Application Priority Data

Nov. 3, 1967 Sweden..............................15083/67

[52] U.S. Cl..........................250/219 LG, 356/167, 250/235
[51] Int. Cl........................................................G01b 7/04
[58] Field of Search.............250/219 LG, 219 WD; 356/158, 356/167, 156; 250/234, 235, 221, 222, 223, 236, 202

[56] References Cited

UNITED STATES PATENTS

| | | | |
|---|---|---|---|
| 2,967,249 | 1/1961 | Quirk | 250/215 X |
| 3,180,995 | 4/1965 | Briggs et al. | 356/167 X |
| 2,931,917 | 4/1960 | Beelitz | 250/219 X |
| 3,016,464 | 1/1962 | Bailey | 250/219 |
| 3,238,374 | 3/1966 | Pfister | 250/219 |
| 3,364,358 | 1/1968 | Ashworth | 250/219 X |

FOREIGN PATENTS OR APPLICATIONS 251,090  4/1964  Australia..............................250/219

Primary Examiner—Walter Stolwein
Attorney—Sommers & Young

[57] ABSTRACT

An optical measuring system for automatically measuring an object of measurement in a measuring plane by automatically tracking and following the position in a measuring plane of a contour defining the object of measurement, by utilizing a detectable difference in a self-emitted or reflected electromagnetic radiation between the object of measurement and a background to the same.

19 Claims, 1 Drawing Figure

Patented April 11, 1972  3,655,990
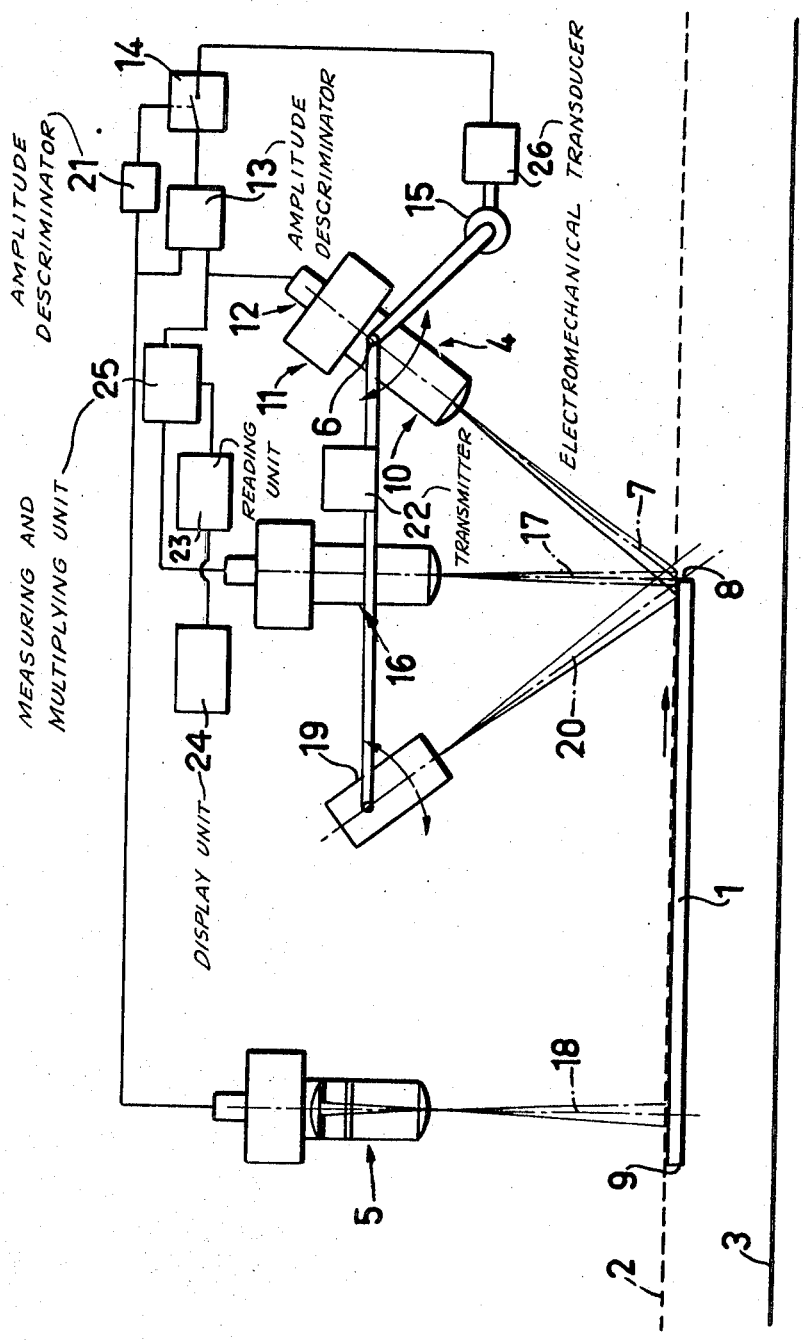

RADIATION SENSITIVE LENGTH MEASURING SYSTEM

The measuring system is characterized in that the measurements are carried out without contact with the object of measurement, and that the measurements can be made on warm objects of measurement as well as on cold ones. The system furthermore, is constructed for automatic measuring, but it nevertheless is built up only of a few necessary devices comprised in the system. The system, moreover, offers the advantage of having a relatively small construction height. The system is primarily constructed for measuring an object being in motion, but it is also possible to carry out measurements on objects standing still.

The invention is substantially characterized in that the system comprises a movable detector unit provided with an optical means for defining the field of vision, said detector unit comprising means for emitting a signal depending on the radiation intensity of the field of vision to a circuit comprising a drive means, which is connected to the detector unit, and for said tracking and following of the contour of the object of measurement, moves the optical axis of the detector unit in the measuring direction at a signal received from said unit.

In said circuit, before the drive means, preferably a device is provided which allows only the passage of such signals from the detector unit which are on the same level with or above a selected level, whereby a distinct limit suitable for certain cases of measurement is determined for the function of the system. The detector unit, according to the invention, may preferably be movable by steps, so that the drive means upon receiving signals passing through said device moves the detector unit a definite step for every signal.

The system, as mentioned above, is particularly intended for measuring objects being in motion. The system according to the invention preferably comprises also a stationary detector unit, which is provided with a means for defining the field of vision and located in the measuring direction at a distance from the movable detector unit. Said stationary detector unit comprises means, which during the period when the object of measurement is located in the field of vision emits a signal to a switch or the like provided in said circuit and maintains the switch in a closed position for the circuit, said movable detector unit being adapted positively to follow one edge of the object of measurement while the object is being moved by the signals emitted from the detector unit to the drive means.

According to the invention, preferably also the signals from the stationary detector unit pass through a device, which allows only he passage of signals being on the same level with or above a selected level, whereby the switch is actuated only by such signals produced by the radiation intensity in the field of vision which are on the same level with or above said level, so that also for this detector unit its function is determined with satisfactory sharpness.

According to the invention, furthermore, the movable detector unit is mounted rotatably about an axle perpendicular to the measuring direction. The drive means hereby preferably comprises a drive mechanism of such a kind, that the size of the angular step of the rotatably detector unit is a function of the angle formed between the optical axis of the optical means comprised in the detector unit and the normal of the object of measurement, whereby the displacement of the point of intersection between the object of measurement and the optical axis in the measuring direction is substantially constant over the measuring field.

To the axle of rotation of the detector unit preferably is connected also a transmitter, which emits a signal proportional either to the angle of rotation of the detector unit or to the displacement of the object of measurement, whereby preferably also a reading unit is provided which upon breaking of the circuit by the switch receives a signal and senses the position of the transmitter as well as sends a length information to an instrument indicating the length value.

According to the invention, furthermore, the signal from the stationary detector unit is adapted to set the selected level in the device for allowing the passage of signals from the movable detector unit to the drive means, or alternatively the level can be set manually. The movable detector unit, according to the invention, may comprise, in addition to and after the optical device for defining the field of vision, which device is located closest to the object of measurement, a radiation collecting means, a radiation modulation means for modulating the amplitude of the ingoing radiation, and a detector means for transforming the ingoing radiation, the intensity of which varies at the same pace as the modulation frequency, into the signal going out from the detector unit. Said outgoing signal may be an electric current, voltage or change in resistance.

For determining and compensating for possible deviations of an object of measurement from the measuring plane, the measuring system according to the invention may also comprise a compensation detector unit provided with an optical device for defining the field of vision, the optical axis of said device extending perpendicular to the measuring plane and coinciding in said plane with the optical axis of the movable detector unit in its starting position for a commenced measuring.

In those cases when the self-emitted radiation by the object of measurement is not sufficient compared with that of the background, the system according to the invention can be completed by a searchlight with a narrow beam of light, which searchlight is mounted movably so that its optical axis intersects the optical axis of the movable detector unit in the measuring plane during the entire course of measuring. The radiation source of the searchlight may be modulated, so that in most cases the radiation modulation means in the movable detector unit is not required. If a background reflecting the radiation is located at a sufficient distance from the measuring plane, according to the invention the searchlight may also be mounted on the movable detector unit and be driven together with the same.

The invention is described in greater detail in the following, with reference to the accompanying drawing showing an embodiment in a schematic way.

The shows the measuring of a measuring object 1 during its motion in a measuring plane 2 against a background 3.

The system comprises two detector units 4 and 5, whereof one (4) is rotatable about an axle (6) perpendicular to the transport direction of the measuring object 1, while the second detector unit 5 is mounted stationary. The measuring of the object is carried out in the transport direction of the object. The measuring principle is as follows. The optical axis 7 of the rotatable detector unit 4 is forced by a drive system to follow one edge 8 of the measuring object, said edge here being called the front edge, until the stationary detector unit 5 discovers the rear edge 9 of the measuring object. At this moment the rotatable detector unit 4 is interrupted in following the front edge 8, the angular turning of the detector unit is measured and transformed into a length measurement value. Said length measurement value is read whereafter the system returns to its non-operative position and is ready for a new measurement.

For being able to carry out a measuring operation, there must be a detectable difference in the self-emitted or reflected electromagnetic radiation between the measuring object and the background. This difference can be accentuated by inserting a suitable filter (not shown) between the measuring object 1 and the detector unit or measuring detector unit 4.

The optical axis 7 of the measuring detector unit is caused to follow the front edge 8 of the measuring object 1 in the manner as follows. By an optical system, designated generally by 10 and comprising lenses and shielding means of suitable design, the susceptibility for incoming radiation is limited to a well-defined area in the transport plane 2 of the measuring object 1. After the system limiting the field of vision there is arranged in the measuring detector unit a radiation-collecting means and a radiation-modulating means, designated generally by 11, as well as a detector with the general designation 12 for the electromagnetic radiation. The radiation-collecting means may be built up as a lens system or as a wave guide (radiation guide). The modulation means has as its object to modulate the incoming radiation and produce an amplitude modulated optical signal before it is applied on the detector 12. The modulation means may be constructed as a mechanical modulator, a so-called light-chopper, or it may be given its modulating properties in that the transmission properties for the wave length band of the radiation used are acted upon by electric, pneumatic or hydraulic means, for example a combination of diffraction in connection with a band-pass filter where the transmission top of the diffraction filter is changed by outside action. When the measuring object 1 is located within the field of vision of the detector unit, thus, to the detector for the radiation an optical signal is supplied whose amplitude varies in accordance with the intensity of the radiation and whose frequency is the frequency of the modulating means. In the detector the incoming radiation is transformed into a signal suitable for continued processing, for example an electric current or voltage or change in resistance. The amplitude of the electrical signal also varies with the intensity of the radiation and its frequency is that of the modulation means. The relation between the highest and smallest signal amplitude depends on how much of the measuring object is located within the field of vision of the detector unit, because the emitted detector signal is assumed to be a function of the incident radiation effect.

The detector signal continues to an amplitude discriminator 13, which allows only the passage of signal amplitudes above a certain value. The discrimination level can be set either manually or automatically as a function of a signal coming from the stationary detector unit 5, or a combination of both. The outgoing signal from the discriminator 13 is applied to a switch 14, which is controlled by the signal coming from the stationary detector unit 5. Said control of the switch 14 is effected in such a way that the signal coming from the discriminator 13 is allowed to pass only when there is a signal from the stationary detector unit 5. The outlet from the switch 14 is connected to a drive means 15 through electro-mechanical transducer 26 for turning the measuring detector unit.

Also the stationary detector unit 5 may, as shown, be connected to an amplitude discriminator 21. The drive means 15 shown is a step mechanism, for example an electric or hydraulic step motor, which upon the arrival of a signal at the drive means turns the measuring detector unit 4 through a definite angular step. The drive mechanism can be so constructed that the size of the angular step is a function of the angle between the optical axes 7 of the measuring detector unit 4 and the normal to the measuring object 1. The angular step function then is such that the displacement of the point of intersection between the measuring object and the optical axes in the measuring direction is almost constant over the measuring field. To the axis of rotation of the measuring detector unit is connected a transmitter 22 emitting a signal, which is proportional either to the turning angle of the measuring detector unit 4 or the displacement of the measuring object 1.

The function of the system is as follows.

The measuring object 1 is advanced to the measuring device. The measuring detector unit 4 is in a non-operative position, so that its optical axis 7 is directed to the measuring object to arrive. When the measuring object enters the field of vision of the stationary detector unit 5, a signal is received from the detector unit, which signal both sets a discrimination level in the discriminator 13 and closes the switch 14 after the discriminator 13. When the front edge 8 of the measuring object arrives at the field of vision of the measuring detector unit 5, the amplitude of the detector signal rises. When the measuring object has covered the field of vision to a sufficient degree, the amplitude of the detector signal will be so great that the discrimination level is reached whereby a signal at the discriminator outlet is obtained. This signal passes through the switch 14 to the drive means 15, which turns the measuring detector unit 4 one step. The step length, the field of vision of the measuring detector unit 4, the step speed and the discrimination level are so adjusted that upon the arrival of a signal at the drive means 15 the angular step is given such a size and is carried out with such a speed that the part of the field of vision which is covered by the measuring object is reduced substantially. The measuring detector unit 4 thereafter is inoperative and waits until the measuring object is advanced so much that it occupies a part of the field of vision of such a size that the discrimination level again is exceeded, whereby the cycle is repeated.

The stepping cycle described continues until the field of vision of the stationary detector unit 5 leaves the measuring object 1. At this moment the signal of the stationary detector unit so actuates the switch 14 that the signal path from the discriminator 13 of the measuring detector unit 4 to the drive means 15 is interrupted. At the same time a signal to a reading unit 23 is received which senses the position of the angle transmitter and presents this position in the form of a length information on a suitable display instrument 24. The transforming of the turning angle of the measuring detector unit into a length information is made by knowledge of the trigonometric and geometric conditions.

As soon as the length measuring value has been presented on the reading unit, a signal to the measuring system is received whereby the system is re-set. This means that the measuring detector unit by help of, for example, a separate impulse generator (not shown) is stepped back to non-operative position.

In those cases when the position of the measuring object 1 in relation to the measuring plane 2 can vary, measuring errors will arise unless a special compensation for the variation in the measuring plane 2 is made. This compensation can be made by a third detector unit or a compensation detector unit, which generally is designated by 16 and so directed that its optical axis 17 forms the normal to the measuring object, and so that the optical axis of the compensation detector unit coincides with the optical axis 7 of the measuring detector unit 4 in the measuring plane 2 when the measuring detector unit is in non-operative position. A prerequisite condition for making the compensation is that the transport speed of the measuring object is known. This speed can be measured by external means, but it may also be obtained by measuring the time between the passage of the front edge 8 of the measuring object through the optical axis 18 and 17, respectively, of the stationary detector unit 5 and the compensation detector unit 16.

If the measuring object 1 is not located in the measuring plane 2, the compensation detector unit 16 and the measuring detector unit 4 will discover the front edge 8 of the measuring object at two different moments. The time between the discoveries by the two detector units is measured and multiplied with the transport speed by measuring and multiplying unit 25, for example, a conventional photoelectric or electromagnetic-type pulse generator and transmitter mechanically coupled to the object conveyor has its output connected to a conventional counter, such as a Model number 5325A counter manufactured by Hewlett-Packard, and the counter is triggered on and off by detector 16 and detector 4, respectively.

The angular turning of the measuring detector unit 4 to the normal for the measuring plane 2 being known when the measuring detector unit is in its non-operative position, the deviation of the measuring object 1 from the measuring plane can be calculated. The correction of the deviation easily can be introduced into the normal measuring system, especially if the length measuring value is obtained by a mechanical model reproduction of the motion of the measuring object.

In those cases when the self-emitted radiation of the measuring object 1 is not sufficient in comparison with that of the background, the system can be completed by a searchlight 19 emitting a narrow beam of a suitable wave-length. The optical axis 20 of the searchlight is automatically so directed that it intersects the optical axis 7 of the measuring detector unit 4 in the measuring plane 2 in question during the entire measuring cycle. Thereby it is desired to obtain the greatest possible angle between the optical axis 20 and 7, respectively, of the searchlight and measuring detector unit in order to prevent illumination of the background 3. When applying a searchlight, its radiation source can be modulated. If the radiation source is modulated, in most cases the radiation modulation device in the measuring detector unit 4 is not required. In those cases when compensation for measuring plane deviation must be made, the searchlight must be so mounted that the compensation detector unit can operate. If a background 3 reflecting the radiation is located sufficiently spaced from the measuring planes used, the searchlight can be mounted on the measuring detector unit and be operated together with the same.

The invention, of course, can be varied in several ways within the scope of the following claims. The measuring, for example, can be so carried out that the measuring detector unit 4 follows the rear edge instead of the front edge 8, and that the stationary detector unit 5 operates as front edge detector unit. This involves that the transport direction of the measuring object is opposite to the direction shown in the drawing by the arrow A.

The measurements can be made, as mentioned in the introductory part, also on measuring objects standing still. In that case the stationary detector unit can be omitted. The movable detector unit sweeps over the measuring object, and the motion is recorded and transformed into a length measuring value in a way as, for example, explained above.

The measuring detector unit, furthermore, instead of being moved by steps as described above can according to the invention be moved continuously and also perform, for example, a translatory motion.

What I claim is:

1. An optical measuring system for automatically measuring the length of an object movable in a measuring plane by automatically tracking and following, in the direction of movement of said object, the position in said measuring plane of one contour defining said object, by utilizing a detectable difference in self-emitted or reflected electromagnetic radiation between said object and a background to said object, comprising; a movable, first detector means, including, optical means adapted to define the field of vision of said first detector and means adapted to produce an electrical signal dependent of the radiation intensity of radiation received by said first detector; drive means connected to said first detector adapted to move the optical axis of said first detector and track and follow said one contour of said object upon receipt of an electrical signal from said first detector; electrical circuit means connecting said first detector to said drive means and adapted to pass an electrical signal from said first detector to said drive means; a stationary, second detector means, including, optical means adapted to define the field of vision of said second detector and means adapted to produce an electrical signal dependent on the radiation intensity of radiation received by said second detector and oriented such that the optical axis of said second detector intercepts said object at a distance from the point where said optical axis of said first detector intercepts said object; and means interposed in sad electrical circuit connecting said first detector and said drive means, electrically connected to said second detector to receive an electrical signal therefrom and adapted to pass an electrical signal from said first detector to said drive means only when it receives an electrical signal from said second detector of an intensity indicating that said object is in said field of vision of said second detector and the radiation received by said second detector is from said object as opposed to background sources.

2. A system in accordance with claim 1 wherein the means interposed in the electrical circuit connecting the first detector and the drive means includes means for passing an electrical signal from said detector to said drive means only when said electrical signal is at least equal to a predetermined magnitude.

3. A system in accordance with claim 1 wherein the means interposed in the electrical circuit connecting the first detector and the drive means includes a first means adapted to pass a signal from said first detector to said drive means only when said signal is at least equal to a predetermined level and said predetermined level is set by and is equal to the signal produced by the second detector when the object is in the field of vision of said second detector.

4. A system in accordance with claim 1 wherein the means interposed in the electrical circuit connecting the first detector the the drive means includes switch means adapted to be closed only when the second detector produces a signal of an intensity indicating that the object is in the field of vision of said second detector.

5. A system in accordance with claim 4 wherein the means interposed in the electrical circuit connecting the first detector and the drive means includes means to close the switch means only when the signal produced by the second detector is at least equal to the predetermined level related to the intensity of radiation from the object.

6. A system in accordance with claim 1 wherein the first detector is movable in a step-wise manner and the drive means moves said first detector a discrete step each time a signal is received from said first detector.

7. A system in accordance with claim 1 wherein the first detector is rotatably mounted about an axis perpendicular to the direction of measurement.

8. A system in accordance with claim 1 wherein a transmitter is connected to the axle of rotation of the first detector and produces a signal proportional to the angle through which said first detector is moved.

9. A system in accordance with claim 1 wherein the signal produced by the transmitter is proportional to the displacement of the object.

10. A system in accordance with claim 1 which includes a reading unit adapted to sense the position of the transmitter and present length information on an instrument when the means interposed in the electrical circuit connecting the first detector and the drive means stops passing an electrical signal from said first detector to said drive means.

11. A system in accordance with claim 2 wherein the drive means is characterized by the face that the magnitude of the angular movement of the first detector is a function of the angle between the optical axis of the optical means of said first detector and the normal to the object whereby displacement of the point of intersection between said object and said optical axis in the measuring direction is substantially constant over the measuring field.

12. A system in accordance with claim 1 wherein the means for passing a signal at least equal to a predetermined level is set manually.

13. A system in accordance with claim 1 wherein the first detector additionally includes radiation collecting means, radiation modulating means adapted to modulate the amplitude of the incoming radiation, and a detector adapted to transform the received radiation into a signal whose intensity varies in accordance with modulation frequency.

14. A system in accordance with claim 13 wherein the signal produced has a characteristic current, voltage or resistance.

15. A system in accordance with claim 1 which additionally includes a compensation third detector adapted to determine and compensate for possible deviations of the object from the measuring plane, including, optical means for defining the field of vision of said third detector, located such that the optical axis of said third detector is perpendicular to the measuring plane and coincides at said measuring plane with the optical axis of the first detector prior to any movement of said first detector.

16. A system in accordance with claim 1 which additionally includes a searchlight having a narrow beam rotatably mounted such that its optical axis intersects the optical axis of the first detector at the measuring plane during the entire measuring cycle.

17. A system in accordance with claim 16 wherein the light of the searchlight is modulated.

18. A system in accordance with claim 16 wherein the searchlight is mounted on the first detector.

19. A system in accordance with claim 1 wherein a filter is interposed between the object and the first detector.

* * * * *